United States Patent [19]

Phillips

[11] 4,397,908

[45] Aug. 9, 1983

[54] ELECTRICALLY NEUTRAL NONPERMSELECTIVE POROUS MEMBRANE

[75] Inventor: Edward L. Phillips, Medford Lakes, N.J.

[73] Assignee: Sybron Corporation, Rochester, N.Y.

[21] Appl. No.: 299,574

[22] Filed: Sep. 4, 1981

Related U.S. Application Data

[63] Continuation-in-part of Ser. No. 99,338, Dec. 3, 1979, abandoned.

[51] Int. Cl.$^3$ .............................................. B32B 5/16
[52] U.S. Cl. .............................. 428/243; 210/500.2; 210/507; 428/240; 428/260; 428/264; 428/265
[58] Field of Search ..................... 210/507, 508, 500.2; 428/240, 241, 243, 245, 247, 255, 262, 265, 260, 272, 264; 427/243, 392, 389.9

[56] References Cited

U.S. PATENT DOCUMENTS

| | | | |
|---|---|---|---|
| 1,693,890 | 12/1928 | Du Claux | 427/244 |
| 1,793,667 | 2/1931 | Baldwin | 428/243 |
| 2,474,201 | 6/1949 | Raymond et al. | 264/45.1 |
| 2,670,305 | 2/1954 | Wiswesser | 427/240 |
| 2,858,570 | 11/1958 | Richards | 264/45.1 |
| 3,096,204 | 7/1963 | Spangler et al. | 427/244 |
| 3,817,772 | 6/1974 | Heit | 427/244 |
| 4,002,791 | 1/1977 | Sawyer | 428/283 |
| 4,138,518 | 2/1979 | Sammah et al. | 428/245 |
| 4,178,271 | 12/1979 | Busch et al. | 428/904 |

FOREIGN PATENT DOCUMENTS 1106979  3/1978  United Kingdom .

*Primary Examiner*—James J. Bell
*Attorney, Agent, or Firm*—Robert A. Gerlach; Owen D. Marjama

[57] ABSTRACT

A nonpermselective porous membrane sheet, which comprises a natural or synthetic fiber material substrate having coated thereon a mixture of a plastic binder material and a non-ion exchangeable filler material, said membrane being capable of transmitting negatively and positively charged ions between the electrodes in an electrodeposition painting operation and at the same time capable of preventing backflow of the electrolytes between the electrode chambers.

7 Claims, No Drawings

ELECTRICALLY NEUTRAL NONPERMSELECTIVE POROUS MEMBRANE

RELATED APPLICATIONS

This application is a continuation-in-part of Applicant's copending Application Ser. No. 99,338, filed Dec. 3, 1979, now abandoned.

BACKGROUND OF THE INVENTION

This invention relates in general to membranes, and more specifically to an electrically neutral nonpermselective porous membrane.

In membrane separation processes there are two forces used to transfer material through the membrane and each is applicable to certain modes of separation. Osmotic and/or hydraulic pressures are used in reverse osmosis, dialysis, simple and ultra-filtration, while an electrical potential is required in electrodialysis. Electrodialysis is unique in itself because the membrane can be designed to selectively transfer either anions or cations, or as in the case of neutral (nonpermselective) membranes, both the anions and cations.

One of the applications of membranes designed for electrodialysis is in the painting of various items, such as auto body parts by electrodeposition. This permits the use of specially formulated water based paints, eliminating the use of solvent and the associated recovery and pollution problems. The water base paint can be designed for either an anionic or a cationic electrodeposition system. This means that the active anionic or cationic portion of the paint is electrically deposited on the item being painted and the oppositely charged free ions generated are removed from the system through a permselective membrane. For the system to work properly, it is important that the undissociated paint molecule touch the item to be painted first which is attached to one electrode of the system. The oppositely charged free ion then generated can move across the system to the oppositely charged electrode where the charge on the free ion is neutralized. The neutralized molecules can now accumulate and would "poison" the system if they were not removed from the painting bath. To prevent the accumulation of inhibiting impurities, the oppositely charged electrode is separated from the bath with an appropriate membrane and the impurity buildup in the chamber between the membrane and the oppositely charged electrode is bled from the system to maintain proper equilibrium.

In cationic electrodeposition, for example, the positively charged paint is deposited on the item attached to the negative electrode. The negative free ion thus generated moves across the painting bath through an anion selective membrane and into the anolyte chamber where the charge is neutralized at the anode and the substance is eventually removed from the system.

It can be seen that an anion selective membrane is used for cationic electrodeposition and that a cation selective membrane is used for anionic electrodeposition. It is possible, however, if the paint is properly formulated and the membrane properly designed, to use a neutral or nonpermselective membrane. This is possible because the unwanted ion, whether it be cationic or anionic, must pass through a membrane into the waste chamber. If the neutral membrane is permeable enough and conductive enough it will allow the transfer of cations or anions. The neutral membrane must also serve as a barrier preventing the flow of the water base paint into the waste chamber. With a properly designed neutral membrane used in an electrodeposition system where the hydrostatic pressure across the membrane can be held to very low levels, all of the required conditions can be met.

It is the purpose of the present invention to design a neutral membrane rugged enough for normal bench work handling in commercial applications and yet durable enough to meet the requirements of a neutral membrane, preferred for use in an electrodeposition system.

SUMMARY OF THE INVENTION

The neutral membrane of the present invention is designed for strong and durable use, especially when used in electrodeposition systems. It consists namely of three parts: a fabric or substrate onto which is coated a mixture of a porous inert filler and a binder. It is essential that a filler be used in order to provide porosity to the coating, and that the fabric be open enough to provide proper anchorage of the coating to the substrate. The following method is representative of one technique which is suitable for making a membrane of the present invention. A coating mixture is made by dispersing a porous filler into an appropriate solvent for a binder. The fabric is dipped into the coating mixture and the excess mixture is removed by passing the fabric through two parallel casting bars. Solvent on the coated membrane is then removed by drying. The coated roll of membrane is then cut up into sheets and pressed in a laminating press with interlayering releasing sheets and cushioning paper. Pressing removes excess porosity and enhances the binding of the coating to the substrate.

The membrane of the present invention is preferably suitable for use in an electrodeposition system of the type described in British Pat. No. 1,106,979, entitled "Electrodeposition of Film-forming Material", which is incorporated herein by reference.

DETAILED DESCRIPTION OF THE INVENTION

The substrate can be made of any suitable synthetic woven fabrics such as polypropylene or polyester, or any suitable natural fibers such as silk, flax, cotton or wool. Other useful substrates materials include: nylon, modacrylics, sarans, polyvinyl chloride, polyethylene and polyamides. Polypropylene fabric is an excellent substrate because of its resistance to high and low pH, and a neutral membrane of the present invention made with this substrate material exhibits high strength with Mullen Burst values of 200+ psig. The fabric weight can range from 1 to 8 ounces per square yard, but a preferred weight is at about 4 ounces per square yard because at this weight a balance between weave openess and weave count can be achieved to ensure good anchorage of the coating to the fabric. Tightly woven fabrics are difficult to properly coat because the coating compound does not penetrate the fabric effectively to bind properly and the coating on the finished membrane has a better tendency to peel. Synthetics made of spun yarn however exhibit better anchorage of the coating than do the filament types. In general, the weave density of the substrate should range from about 40 to 300 total number of yarns or threads per square inch or stated another way, the warp plus woof should total between 40 and 300.

The selection of the binder can be made from any one of a number of plastics for which there is a suitable solvent. If the substrate is good for a wide range of pH exposure, then it also may be best to select a binder good for a wide range of pH so that the construction of the membrane is consistent. For example, polyvinylidene fluoride is good for a wide range of pH and so is a substrate of polypropylene fabric. The combination would then be compatible if the range of pH exposure becomes a factor in the membrane use or application. The binder in powder form is desirable because of the ease of dissolution. Polyvinylidene fluoride powder dissolves readily in dimethyl formamide at room temperatures whereas the pellet form is very difficult to dissolve. Other useful binders include: polyvinyl chloride, polyvinylidene chloride, polyvinyl acetate, cellulose acetate, polyacrylonitrile, acrylic polymers and styrene polymers.

In compounding the coating mixture, which consists of a binder, a filler, and a solvent for the binder, it is important that the filler contain no ion exchangeable groups. In fact, all components of the neutral membrane including the binder and the substrate must be non-permselective.

The filler can be most any porous substance finely ground to less than 100 mesh which remains inert and is insoluble in the solvent throughout the compounding and manufacturing of the membrane. An essential requirement of the fillers used in the present invention is that they comprise a porous material. This porosity is necessary in order to provide paths through the membrane which allow for the aqueous flow of ions through the membrane during use. Suitable materials include finely ground macroporous styrene based polymers available under the tradename P-818 from Ionac Chemical Company or gel type crosslinked styrene based polymers available under the tradename Ionac P-900 or P-925 from Ionac Chemical Company or any other inert porous resinous material. However, the best fillers are porous inert substances that absorb water and have a tendency to swell in water. Materials in this class include cellulose substances such as wood and the nonselective starches. Other useful materials include sugars, flours, natural gums, gelatin, and cellulose.

Compounding is achieved by dispersing the finely ground filler into a solvent for the binder after which the binder is added and dissolved. There is a gradual thickening of the mixture and it is best to allow the mixture to age for about 24 hours and to remix before using. This allows the gel-like particles (fish eyes) in the binder to dissolve and stabilize the viscosity, which could range between 200 and 15,000 cps depending on the relative amounts of binder and solvent used. Further aging of the mixture generally means a further increase in viscosity and eventually the gelling of the mixture. Usually the pot life of the mixture can be extended by remixing and adding a little more solvent before gelling occurs. Suitable solvents include: dimethyl formamide, dimethyl acetamide, dimethyl phthalate, diisobutyl ketone, toluene, xylene, dimethyl sulfoxide, propylene carbonate, sutyrolactone, tetrahydrofuran and methyl isobutyl ketone.

To obtain the desired porosity and electrical properties in the membrane, a certain ratio of filler to binder must be used in the coating mixture and this ratio will remain fixed even though a little more or less solvent is used to adjust the viscosity. In order to obtain this combination of desired porosity and electrical properties the filler-binder ratio must be maintained from about 0.8:1 to 5:1. At low ratios of filler to binder, the electrical resistance goes up and the porosity goes down and conversely at high ratios the electrical resistance goes down and the porosity goes up. Too much filler and not enough binder will weaken the membrane making it unsuitable for use.

The coating of the fabric can be done in a normal dip coating process usually on a single pass which results in the yarns or threads of the substrate being impregnated and the interstices of the weave being filled with coating material. Multipasses are done with the low viscosity coating mixture in which casting bars may or may not be used to adjust the pickup on each pass. Single passes are done with the thicker coating compounds and the casting bars are invariably used. The total pickup of the coating compound, dry basis, can be varied, from 2 to 12 ounces per square yard. When casting bars are used, the amount of pickup can be controlled by separating the bars from about 20 to 60 mils depending on the weight and thickness of the fabric, the viscosity of the coating compound and the desired pickup. The input width of the fabric is generally trimmed oversize to allow for shrinkage.

Coating and drying of the coated fabric are done consecutively in a continuous mill in which the coated fabric leaves the casting bars vertically into a drying tower in which the solvent is driven off leaving intact on the fabric the filler and the binder. The dry coated fabric, in which most of the solvent has been removed, is wound up into a roll at the end of the mill. The speed of the mill will vary from about 50 to 300 yards per hour depending on the size and temperature of the drying tower. A 50 foot tower, for example, might be run at 200 yards per hour at 250° F.

Usually the dry coated fabric from the coating process has too great a porosity, is wrinkled and difficult to lay into a smooth flat surface. To correct this situation and to improve the binding of the coating to the fabric, the final step in the membrane manufacture consists in taking the rolls of coated fabric, cutting them up into sheets of desired length and pressing them in a laminating press. Several sheets are pressed at a time and to prevent them from sticking to each other they are wafered between sheets of filmed (1 to 2 mils) cellophane or Mylar and each ply is separated by a sheet of cushioning paper, about 99 pound weight. Pressing is done at a pressure of about 600 psi with a total force based on the area of the membrane. The press, with heating mantels, is heated to about 300° F. and held under the given temperature and pressure for a period varying from five minutes to one hour. The press is then cooled before releasing the pressure and unloading.

The following parameters characterize membranes of the present invention:

The comparative acid removal number for a given membrane represents a critical parameter. The comparative acid removal number is a quantitative measurement of the amount of acid removed from the coating bath and is essential to control the pH of the coating mix itself. The recommended range for this number is 250–400 milli equivalents (meq). A value of under 250 would indicate that the acid was building up in the coating mix with adverse effects including increased corrosion of equipment due to low pH, poor throw power (lack of ability to coat recessed areas of the part being coated) and poor film buildup on the coated part. An acid removal number of over 400, while not being as critical as a low value, is also detrimental to the performance of the coating system. The effects of the high removal number, resulting in a high pH of the coating mix, include poor shear stability of the coating mix as it is being pumped and poor stability of the dispersion itself. However to a certain extent, a high removal number can be compensated for by addition of material to the coating bath. To determine the comparative acid removal number, each membrane sample is tested in a small laboratory electrodeposition painting apparatus under identical conditions. The impurities (by-products of the electrodeposition) that passed through the membrane into the anolyte cell are quantitatively neutralized and the milli equivalents (meq) of impurities is expressed as a comparative acid removal number.

The water permeability of the membrane is a measure of its porosity and can, range from about 1,000 up to 100,000 cc/hr/sq ft at 2 psig water pressure. A normal range for most of the neutral membranes is from about 1,000 to 10,000 cc/hr/sq ft at 2 psig. To measure the water permeability of the neutral membrane, a sample (approximately eight inches in diameter) is presoaked in water and placed in an apparatus in which water pressure at 2 psig is applied to one surface of the membrane. The water permeating through the membrane to the opposite surface (at atmospheric pressure) is collected over a period of time from which the water permeability in cc/hr per sq ft can be calculated.

The percentage of gel water is a measure of the water absorbing properties of the membrane due mostly to the filler and indicates to some extent the ability of the membrane to provide aqueous channels or pores for the migration of ions. The desired range should be at least about 15 up to 40 percent. The percent gel water is determined by soaking a sample of the membrane in water after which it is blotted to remove excess water and then weighed. The sample is then dried at 105° C., cooled and reweighed. The loss in weight on drying over the wet blotted weight times 100 is the percent gel water.

The thickness of the membrane should be between about 10 to 20 mils (thousandths of an inch). Normally the thinner the membrane the less the specific area resistance but this can be offset in thicker membranes by having a greater porosity.

The bursting strength (Mullen Burst Strength) of membranes of the present invention was measured on a Mullen Tester. The general range was greater than 200 psi indicating a comparatively strong membrane.

It is desirable to keep the specific area resistance value as low as possible because the higher the specific area resistance the greater the electrical energy needed when using the membrane in an electrodeposition painting setup. In most cases values less than 10 ohm-cm$^2$ were obtained with the neutral membrane but where the porosity of the membrane was poor much greater values were obtained. The specific area resistance was determined by checking the resistance across a cell containing platinum electrodes and an electrolyte of 1.0 N NaCl. The difference in resistance was measured with and without the membrane sample partitioning the two electrodes. The cell is so constructed that the difference in resistance is a direct reading of the specific area resistance of the membrane.

DESCRIPTION OF THE PREFERRED EMBODIMENTS

The following examples further specifically define the present invention with respect to a method of making and testing an electrically neutral nonpermselective porous membrane. The percentage in the disclosure, examples and claims are by weight. The examples below are intended to illustrate various preferred embodiments of the present invention.

EXAMPLE 1

A coating mixture is prepared by dispersing 207.3 grams of nonselective starch powder (Staley pure food starch) into 475 grams of dimethyl formamide. To this mixture is added and dissolved 51.8 grams of polyvinylidine fluoride powder. The filler to binder ratio was 4:1 and the resulting viscosity was 1000 cps at 23° C. A strip of spun polypropylene fabric having a warp and woof of about 90, 9¼" wide was then dip coated with the coating mixture while removing excess coating compound with parallel casting bars separated by 30 mils. The 8 foot strip of coated fabric was hung in a dryer at 230° F. and dried for 10 minutes to remove the voltiles to less than 1%. The dried coated fabric was then cut up into 10 sheets 8"×8½" and made up into a stack with sheets of 1 mil cellophane on either side of the membrane and each ply separated with a sheet of 99 lb weight cushioning paper with a sheet of cushioning paper on either end of the stack. The stack was then loaded into a laminating press and pressed under a total force of 40,000 lbs., approximately 600 psi on the membrane, and heated at 290° F. for 5 minutes. The finished membrane contained 47.3% starch and weighed 10.12 oz/sq yard of which 5.98 oz/sq yd was coating pickup. The membrane had a thickness of 14.3 mils and a Mullen Burst strength of 200+ psi. The gel water was 22.4% and the specific area resistance in 1.0 N NaCL was 3.3 ohm-cm$^2$. The water permeability at 2 psig was 6450 cc/hr/sq ft and the comparative acid removal number in an electrodeposition set up was 299.

EXAMPLE 2

A coating mixture is prepared by dispersing 215.2 grams of sucrose, finely ground powder (pure cane sugar, 10×), into 444.7 grams of dimethyl formamide. To this mixture is added and dissolved 69.4 grams of polyvinylidene fluoride powder. A small amount, 0.7 grams of sodium benzoate was added as a preservative. The resulting viscosity was 2400 cps at 33° C. The filter to binder ratio was 3.1:1. A strip of spun polyproplyene fabric of the type used in Example 1 was coated with the coating compound as in Example 1 using a casting bar spaced 30 mils. The coated fabric was then dried, cut into sheets, and pressed as in Example 1 at 600 psi and 290° F. for 5 minutes. The finished membrane contained 44.0% sucrose and weighed 10.18 oz/sq yd of which 5.93 oz/sq yd was coating pickup. The membrane thickness was 14.4 mils and the Mullen Burst strength was 200+ psi. The gel water was 36.7% and the specific area resistance in 1.0 N NaCl was 3.0 ohm-cm$^2$. Water permeability at 2 psig was 85,500 cc/hr/sq ft. The comparative acid removal number in an electrodeposition setup was 269.

Other modifications and ramifications of the present invention would appear to those skilled in the art upon reading this disclosure. These are also intended to be within the scope of this invention.

I claim:

1. An electrically neutral nonpermselective porous membrane suitable for use in an electrodeposition system which exhibits a comparative acid removal number of from about 250 to 400 milli equivalents which comprises a woven fabric substrate having coated thereon a mixture of a binder material and a non-ion exchangeable inert porous filler material in a filler to binder weight ratio of 0.8:1 to 5:1, wherein the binder comprises at least one material selected from the group consisting of polyvinylchloride, polyvinylidene chloride, polyvinylidene fluoride, polyvinyl acetate, cellulose acetate, polyacrylonitrile, acrylic polymers and styrene polymers; and the filler comprises at least one material selected from the group consisting of macroporous crosslinked styrene based polymers, gel type crosslinked styrene based polymers, wood, starch, sugar, flour, natural gum, gelatin, and cellulose, with the porosity of said filler material forming a plurality of random paths which pass through the thickness of the membrane, with said membrane being capable of transmitting negatively and positively charged ions between the electrodes in an electrodeposition painting operation and at the same time capable of preventing backflow of the electrolytes between the electrode chambers.

2. The membrane of claim 1 in which the fabric substrate comprises a synthetic material.

3. The membrane of claim 2 in which the synthetic material comprises at least one material selected from the group consisting of polypropylene, polyesters, acrylics, saran, polyvinyl chloride, polyethylene and polyamide.

4. The membrane of claim 1 in which the fabric substrate is made up of a natural fiber.

5. The membrane of claim 4 in which the natural fiber comprises at least one material selected from the group consisting of cotton, wool, flax and silk.

6. The membrane of claim 1 in which the fabric substrate comprises a blend of synthetic and a natural fiber.

7. An electrically neutral nonpermselective porous membrane suitable for use in an electrodeposition system which exhibits a comparative acid removal number of from about 250 to 400 milli equivalents which comprises a woven polypropylene fabric substrate having coated thereon a mixture of polyvinylidene fluoride binder material and a non-ion exchangeable inert porous filler material in a filler to binder weight ratio of 0.8:1 to 5:1, with the porosity of said filler material forming a plurality of random paths which pass through the thickness of the membrane, with said membrane being capable of transmitting negatively and positively charged ions between the electrodes in an electrodeposition painting operation and at the same time capable of preventing backflow of the electrolytes between the electrode chambers.

* * * * *